United States Patent [19]

Dyroff et al.

[11] 4,225,685
[45] Sep. 30, 1980

[54] PREPARATION OF POLYMERIC ACETAL CARBOXYLATES USING ORGANOALUMINUM COMPOUNDS

[75] Inventors: David R. Dyroff, Creve Coeur; Victor D. Papanu, Maryland Heights, both of Mo.

[73] Assignee: Monsanto Company, St. Louis, Mo.

[21] Appl. No.: 49,992

[22] Filed: Jun. 18, 1979

[51] Int. Cl.$^2$ .................... C08F 283/06; C08G 6/00
[52] U.S. Cl. .................................. 525/401; 528/230; 528/238; 528/245; 528/246; 528/485
[58] Field of Search ............... 528/230, 238, 245, 246, 528/485; 525/398, 401

[56] References Cited

U.S. PATENT DOCUMENTS

| | | | |
|---|---|---|---|
| 4,140,676 | 2/1979 | Crutchfield et al. | 525/398 |
| 4,144,226 | 3/1979 | Crutchfield et al. | 525/401 |
| 4,146,495 | 3/1979 | Crutchfield et al. | 252/89 R |

Primary Examiner—Lucille M. Phynes
Attorney, Agent, or Firm—S. M. Tarter; W. H. Duffey; F. D. Shearin

[57] ABSTRACT

The alkali metal, ammonium and alkanol ammonium salts of polymeric acetal carboxylates are stable detergent builders under laundry use conditions but depolymerize in mildly acidic media, making the polymer fragments more readily biodegradable in waste streams. Such polymeric acetal carboxylates can now be made by a process which comprises bringing together in a reaction zone under polymerization conditions an ester of glyoxylic acid and a polymerization initiator, and adding to the resulting polymer an alkyl vinyl ether and an organoaluminum compound to stabilize the resulting polymer against rapid depolymerization in alkaline solution. The preferred alkyl vinyl ether is ethyl vinyl ether, and the preferred organoaluminum compounds are alkyl aluminum halides and trialkyl aluminum.

17 Claims, No Drawings

PREPARATION OF POLYMERIC ACETAL CARBOXYLATES USING ORGANOALUMINUM COMPOUNDS

BACKGROUND OF THE INVENTION

This invention relates to an improved method of preparing polymeric acetal carboxylates, which are useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STPP) has been found to be a highly efficient cleaning and detergency builder and this compound has been widely used for decades in cleaning formulations. Indeed, millions of pounds of STPP are used each year in cleaning formulations because of its superior builder qualities. However, because of the recent emphasis on removing phosphates from detergent and cleaning compositions for environmental reasons, the detergent and cleaning industry is now looking for materials suitable for use as builders which do not contain phosphorus and which are environmentally acceptable.

Polymeric acetal carboxylates have been found to be suitable as a replacement for STPP in detergent compositions. The composition of such polymeric acetal carboxylates has been disclosed in U.S. Pat. No. 4,144,226 issued Mar. 13, 1979 and in U.S. patent application Ser. No. 962,512 filed Nov. 20, 1978. The use of such polymeric acetal carboxylates in detergent compositions is disclosed in U.S. Pat. No. 4,146,496 issued Mar. 27, 1979. A preferred method for the saponification of the esters of the polymeric acetal carboxylates to form the corresponding alkali metal salts is disclosed in U.S. Pat. No. 4,140,676, issued Feb. 20, 1979. The polymeric acetal carboxylate salts described in the above application and patents were tested for sequestration function using the procedures described by Matzner et al in "Organic Builder Salts as Replacements for Sodium Tripolyphosphate", TENSIDE, 10, No. 3, pages 119–125 (1973). As a result of such tests, the polymeric acetal carboxylate salts were found to be superior detergent builders compared to STPP, and were stable under laundry use conditions but depolymerized at lower pH making the polymers more readily biodegradable.

Although the methods for preparing the polymeric acetal carboxylates disclosed in the above patents and patent application are satisfactory, there is a need for improved processes to prepare such materials to achieve greater efficiencies. Now according to the present invention, an improved process is provided for stabilizing the polymeric acetal carboxylates against rapid depolymerization in alkaline solution by using an efficient catalyst to add to the polymer termini an end group which will stabilize the polymer against rapid depolymerization in alkaline solution.

SUMMARY OF THE INVENTION

These and other advantages are achieved by a process which comprises:

(a) bringing together in a reaction zone under polymerization conditions an ester of glyoxylic acid and a polymerization initiator, and (b) adding to the resulting polymer in the presence of an organoaluminum compound an alkyl vinyl ether to stabilize the resulting polymer against rapid depolymerization in alkaline solution, the organoaluminum compound being selected from the group consisting of trialkylaluminums, alkylaluminum hydrides, alkylaluminum alkoxides, and alkylaluminum halides in which the alkyl groups, alike or different, have 1 to about 10 carbon atoms each.

For the purposes of this invention, the term "rapid depolymerization in alkaline solution" as it is used in the specification and claims, shall mean that in an aqueous solution of 0.5 molar sodium hydroxide containing 10 grams per liter of the polymer of the present invention, the average chain length of the polymer will be reduced by more than 50 percent, as determined by Proton Magnetic Resonance, after 1 hour at 20° C.

Broadly described, the polymeric acetal carboxylates of the present invention can be prepared by bringing together in a reaction zone under polymerization conditions an ester of glyoxylic acid, optionally one or more comonomers, and a polymerization initiator to form a polymer believed to have the following empirical formula:

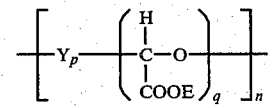

wherein Y is one or more comonomers randomly distributed along the polymer chain selected from the group consisting of alkylene oxides and aldehydes having up to 12 carbon atoms; n averages at least 4; p is 0 to an average of about 5; q is at least 1; and E is an alkyl group having 1 to about 4 carbon atoms.

Thereafter, there is added to the resulting polymer an alkyl vinyl ether and an organoaluminum compound to provide a chemically stable end group derived from the alkyl vinyl ether to stabilize the resulting polymer against rapid depolymerization in alkaline solution. Thereafter, the polymeric ester is saponified to the corresponding polymeric alkali metal salt by contacting the polymeric ester with an alkali metal hydroxide.

Any number of esters of glyoxylic acid can be used as one starting material to prepare the polymer product of the present process. The hemiacetal form of the esters can be made by the reaction of an alcohol containing from 1 to 4 carbon atoms with an acid hemiacetal or acid hydrate under conditions known to those skilled in the art. Suitable esters include those having from 1 to about 4 carbon atoms in the alkoxy group, such as methyl, ethyl, propyl, isopropyl, butyl, isobutyl and the like. Other esters of glyoxylic acid can also be used, provided that the particular ester does not interfere with the polymerization, cause the polymer to undergo rapid depolymerization in alkaline solution, or interfere with the intended function of the polymer as a chelant, sequestrant or detergent builder, and such esters of glyoxylate are equivalent for purposes of this invention. Methyl and ethyl esters are preferred. Thereafter, the resulting ester hemiacetal can be converted to the corresponding aldehyde ester by any number of techniques known to those skilled in the art, such as the reaction of the ester hemiacetal with phosphorus pentoxide according to the following general equation:

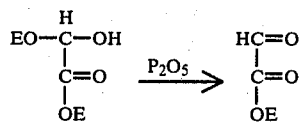

where E is an alkyl group having 1 to 4 carbon atoms.

Any number of comonomers known to those skilled in the art optionally can be copolymerized with the aldehyde ester to form the polymer product of the present invention. It is only necessary that the comonomer does not inhibit polymerization or cause the polymer to undergo rapid depolymerization in alkaline solution. Suitable comonomers include: alkylene oxides, such as ethylene oxide, propylene oxide, epihalohydrin, epoxysuccinate and the like; aldehydes such as formaldehyde, acetaldehyde, as well as aldehydes containing up to 12 carbon atoms, and the like. Comonomers having from 1 to 4 carbon atoms, such as ethylene oxide, formaldehyde or acetaldehyde are preferred.

Mixtures of comonomers can be polymerized with the aldehyde ester to form a terpolymer, or even a more complex polymeric structure. For example, mixtures of the same class of comonomers, such as a mixture of epoxy compounds like ethylene oxide and propylene oxide, can be copolymerized with the aldehyde ester to form a terpolymer. Numerous other examples will occur to those skilled in the art in view of the present disclosure, such as a mixture of ethylene oxide and formaldehyde.

As will occur to those skilled in the art in view of the present disclosure, the number of carboxylate groups in the polymer of the present invention is important since the number of carboxylate groups affect the usefulness of the corresponding polymer salt as a chelant, sequestrant and detergent builder. Hence, the nature of the comonomer or comonomers (i.e., the nature of Y), the mole ratio of comonomer to aldehyde ester (i.e., the value of p and q) and the number of repeating units in the polymer of the present invention (i.e., the average value of n) are each interrelated and important since they affect the number of carboxylate groups in the polymer.

The mole ratio of aldehyde ester to comonomer or comonomers (i.e., the ratio of q to p) is important. Although there is theoretically no upper limit to the ratio of the moles of comonomer or comonomers to the moles of acetal carboxylate segments in the polymer, when the mole ratio of comonomer to acetal carboxylate segments exceeds about 5:1 (i.e., p averages about 5 and q is 1), the polymer salt loses much of its effectiveness as a chelant, sequestrant and detergent builder. It is preferred that the mole ratio of acetal carboxylate to comonomer is at least about 1:2 or about 1:1 (i.e., p and q are each about 1) or higher, say 5:1 or even 50:1 (i.e., p is 1 and q is at least about 5, say 50). Of course, the polymer of the present invention is usually most effective as a chelant, sequestrant and detergent builder when a comonomer is not present, i.e., when p equals 0. On the other hand, the comonomers can frequently provide special properties to the polymer, e.g., improved biodegradability. It is preferred to use a relatively small comonomer that does not disperse the carboxylate groups too widely or inhibit chelation by steric hindrance, such as ethylene oxide or formaldehyde.

Any number of initiators can be used for the polymerization. Nonionic or ionic initiators provide satisfactory results. Suitable initiators include: amines, such as triethyl amine, 2-hydroxy pyridine-$H_2O$ complex and the like. Even traces of hydroxy ion or cyanide ion will trigger the polymerization. Molecular sieves such as those disclosed in U.S. Patent Application C43-21-4520A filed concurrently herewith have been used.

The number of repeating units, i.e. the average value of n, in the polymer product of the present invention is also important, since the effectiveness of the polymer salt as a chelant, sequestrant and cleaning and detergency builder is affected by the average chain length. Even when the polymer averages only four repeating units (i.e., n averages 4) the polymer shows some effectiveness as a sequestrant, chelating agent and builder. Although there is no theoretical upper limit to the described number of repeating units, which may average as high as 400, or even higher, there does not seem to be an advantage to having a polymer to be used as a builder with an average of more than about 200 repeating units. When the average number of repeating units exceeds about 100, significant improvement in sequestration, chelation and builder properties is not observed. Thus, it is preferred that the polymer of the present invention contain an average between about 10 and about 200 units, and even more preferred that the polymer contains an average between about 50 and about 100 repeating units in the chain.

Important factors believed to control the chain length of the polymer include: (1) the initiator concentration, (2) the temperature of the polymerization, (3) the purity of the starting materials, and (4) solvent levels. As will occur to those skilled in the art, these factors are all interrelated and the desired chain length can easily be controlled by simple experimentation by controlling these variables.

According to the process of the present invention, after the aldehyde ester has been polymerized, with or without a comonomer as discussed above, there is then added to the resulting polymer an alkyl vinyl ether to stabilize the resulting polymer against rapid depolymerization in an alkaline solution using the organoaluminum compound as the catalyst.

The organoaluminum compounds useful as a catalyst to add the alkyl vinyl ether to the polymer termini to stabilize the polymer against rapid depolymerization in alkaline solution, are known to those skilled in the art, and many are commercially available. The organoaluminum compounds are selected from the group consisting of trialkyl aluminums ($R^1R^2R^3Al$), alkyl aluminum hydrides ($R^1R^2AlH$ and $R^1AlH_2$), alkyl aluminum alkoxides ($R^1R^2AlOR^3$), and alkyl aluminum halides ($R^1R^2AlX$ and $R^1AlX_2$) in which the alkyl groups, alike or different, have 1 to about 10 carbons each. Suitable compounds include trimethyl aluminum, triethyl aluminum, tri-n-propyl aluminum, triisobutyl aluminum, tri-n-hexyl aluminum, tri-n-octyl aluminum, tri-n-decyl aluminum, diethyl aluminum hydride, diisobutyl aluminum hydride, diethyl aluminum ethoxide, diisobutyl aluminum ethoxide, diethyl aluminum chloride, diisobutyl aluminum chloride, ethyl aluminum dichloride, butyl aluminum dichloride and the like. The trialkyl aluminums such as triethyl aluminum or triisobutyl aluminum and alkyl aluminum halides such as ethyl aluminum dichloride are preferred.

Although satisfactory results are obtained with the organoaluminum compounds as the sole catalyst, it is preferred in some cases to use the organoaluminum compound along with a small amount of a Lewis acid. The mole ratio of organoaluminum compound to Lewis acid can vary within wide limits, for example from about 4:1 to about 1:4, preferably from about 2:1 to about 1:1.

Any number of Lewis acids can be used with the organoaluminum compound in the process of the present invention, for example phosphorus pentafluoride, stannic chloride and the like. It is preferred to use a metallic halide selected from the halides of titanium, zirconium, hafnium, boron and aluminum. Chlorine is the preferred halogen. Suitable Lewis acids for use with the organoaluminum compounds include, but are not limited to, titanium tetrachloride, titanium trichloride, aluminum trichloride and the like. Titanium tetrachloride and titanium trichloride are preferred.

Suitable alkyl vinyl ethers include methyl vinyl ether, ethyl vinyl ether, propyl vinyl ether, isopropyl vinyl ether, isobutyl vinyl ether and the like. Even vinyl ethers having up to 20 carbon atoms in the alkyl chain, such as octadecyl vinyl ether, can be used although it is preferred to use alkyl vinyl ethers having up to about 6 carbon atoms, such as the methyl, ethyl or propyl vinyl ethers.

The conditions for adding the chemically stable end group derived from the alkyl vinyl ether to the polymer termini to stabilize the polymer against rapid depolymerization in alkaline solution can vary within wide limits. The temperature at the beginning of the reaction can vary between about $-30°$ C. to about $50°$ C., although satisfactory results are obtained between $0°$ C. and about $20°$ C. The temperature rise after the end-capping reaction has started is not critical, although it is preferred to prevent a temperature rise of more than about $50°$ C. Satisfactory results are obtained at atmospheric pressure although higher or lower pressures could be used.

The amount of organoaluminum compound, with or without a Lewis acid, to be used as a catalyst to add the chemically stable end group derived from the alkyl vinyl ether to the polymer termini, according to the process of the present invention, can also vary within wide limits. It is only necessary that there is a sufficient amount of organoaluminum compound, under the conditions of the reaction, to act as a catalyst to add the chemically stable end group to the resulting polymer. Satisfactory results can be achieved using from about 0.05 mole percent to about 2 mole percent, based on the number of moles of aldehyde ester. It is preferred to use from about 0.1 mole percent to about 0.5 mole percent, based on the number of moles of aldehyde ester used as the monomer to prepare the polymer product.

By the process of the present invention, the chemically stable group which is added at each end of the polymer to stabilize the polymer against rapid depolymerization in alkaline solution can be derived from 1 to about 4 alkyl vinyl ether molecules. The number of alkyl vinyl ether molecules to form the chemically stable group added at each end of the polymer depends on a number of factors, as will occur to those skilled in the art in view of the present disclosure, such as the purity of the reactants, catalyst type, temperature and the like. More than 4 alkyl vinyl ether groups can be used to form the chemically stable group added to each end of the polymer, but additional stabilization is not achieved from a chemically stable group derived from a greater amount of alkyl vinyl ether. It is preferred to have a chemically stable group derived from less than 4 alkyl vinyl ether groups at the polymer end, say 1 to 3 groups of vinyl ether. A chemically stable group is necessary at each polymer end to insure that the polymer is stabilized against rapid depolymerization in an alkaline solution.

The stabilized polymer ester is useful as an intermediate to prepare the corresponding alkali metal, ammonium or alkanol amine salts. It is only necessary to saponify the stabilized polymer ester with a base, such as lithium hydroxide, sodium hydroxide, potassium hydroxide and the like, using conventional saponification techniques to make a salt suitable for use as a builder and as a sequestrant. The ammonium or alkanol amine salts can be prepared from the corresponding alkali metal salts using conventional ion exchange techniques.

The amount of polymer salt required to effectively complex the ions in a given system will depend to some extent on the particular polymer salt being used and the particular metal ion in the aqueous media. Because the polymer tends to depolymerize in acid media, effective complexing is limited to neutral or preferably basic solution. Optimum conditions and amounts of the polymer salt to be used can readily be determined by routine experimentation.

The polymer salts are also useful as builders in detergent formulations. Since the pH of the detergent solution is usually between pH 9 and pH 11, the polymer salts will not depolymerize rapidly when used as a detergent builder in aqueous solution at normal use concentrations (about 1200-1500 ppm detergent formulation in the wash water), temperature ($10°$–$60°$ C.) and times (i.e., about 15 minutes) typical of United States home laundry practices. Generally, the use of the alkali metal salts, particularly the sodium salt, is preferred. However, in some formulations where greater builder solubility is required, the use of ammonium or alkanol amine salts may be desirable.

The detergent formulations will contain at least 1 percent by weight and preferably at least 5 percent by weight of the polymer salts. In order to obtain the maximum advantages of the polymer salts as builders, the detergent should preferably contain from about 5 percent to about 75 percent of these salts. The polymer salts can be the sole detergency builder, or the polymer salts can be utilized in combination with other detergency builders which may constitute from 0 to 95 percent by weight of the total builders in the formulation. The amount and choice of builder, surfactant and other detergent ingredients, such as optical brighteners, fillers, bleaches, dyes, soil antiredeposition agents, perfumes and the like, will be in accordance with well understood practices of detergent formulation.

DESCRIPTION OF THE PREFERRED EMBODIMENTS

This invention is illustrated by, but not limited to, the following Examples wherein all percentages are by weight unless otherwise noted.

EXAMPLE I

This Example illustrates the preparation of the anhydrous ester aldehyde useful to prepare the polymers of the present invention.

A 2-liter, 4-necked, round bottom flask equipped with an overhead stirrer, thermometer and 30 centimeter Vigreaux column and take-off head, is charged with 1200 grams (10grams) of methyl glyoxylate methyl hemiacetal. A total of 568 grams of phosphorus pentoxide (4 moles) is added in 4–6 portions, keeping the reaction temperature below 90° C. The addition requires about 90 minutes. When the addition is complete, the mixture is stirred until the temperature has fallen to about 70° C. (0.5 hour). The mixture is distilled at aspirator vacuum (20–40 torr) yielding 764 grams crude methyl glyoxylate having a boiling point of 56–61° C.; the distillation is stopped when the pot temperature reaches 125° C. Chromatographic analysis of this crude material indicates 86.6 percent glyoxylate, 9.3 percent methyl dimethoxyacetate, 3.3 percent dimethyl oxalate and trace amounts of unidentified products.

The crude product is then distilled from 25 grams of 3A molecular sieves (which had been heated to about 125° C. to drive off residual moisture and organics) through the Vigreaux column. A 15-gram forecut of about 97 percent pure glyoxylate is collected initially. The Vigreaux column is replaced by a 30.5 centimeter Widmer column and 521 grams of 99 percent pure polymerizable grade methyl glyoxylate is collected having a boiling point of 83°–84° C. at 210 torr. A final cut of 36 grams (93 percent pure) ester is collected in a final fraction (84°–91° C.; 210 torr). The overall yield of polymerizable glyoxylate is 59 percent from the hemiacetal.

The polymerization glyoxylate is stored in a glass-stoppered bottle at −70° C. until ready for use.

EXAMPLE II

To a 100 milliliter, 3-necked, round bottom reaction flask equipped with an efficient stirrer, a thermometer and a gas inlet tube was added 12.8 grams (0.145 mole) of the freshly distilled aldehyde ester from Example I and 4.3 grams of methylene chloride. The flask was cooled to −5° C. and 75 microliters of 0.05 normal sodiodiethyl methylmalonate in tetrahydrofuran was added to the solution. After 10 minutes, the polymerization became rapid as evidenced by an exotherm to about 20° C. The flask was cooled back to below 0° C. and 2 milliliters of methylene chloride were added. After 20 minutes, 0.13 milliliter of 25 percent triethyl aluminum (0.00028 mole) in toluene was added, and 30 minutes later 1.4 milliliters (0.015 mole) of ethyl vinyl ether was added to the flask. The reaction temperature was allowed to rise to room temperature over a 40 minute period and the solution was stirred for another 3 hours at room temperature. The solution was then washed with two 25 milliliter portions of xylene. The reaction solution was cooled to 0° C. and 23 milliliters of 6.7 molar sodium hydroxide were added. The solution was stirred overnight at room temperature. Then, 30 milliliters of methanol were added and stirred for 1 hour. The resulting slurry was filtered and dried in a vacuum for 18 hours at 35° C. The resulting sample weighed 12.1 grams (86 percent yield based on the aldehyde ester).

A sample of the polymer salt prepared above was tested for sequestration function using the procedure described by Matzner et al, "Organic Builder Salts As Replacements for Sodium Tripolyphosphate", TENSIDE, 10, No. 3, pages 119–125 (1973). The sequestration of calcium and magnesium ions as a percent of STPP performance showed that the polymer salt was about 114 percent of STPP.

EXAMPLE III

The procedure of Example II was repeated except that acetonitrile was used as the solvent instead of methylene chloride. The yield was 89 percent and the sequestration of calcium and magnesium ions as a percent of STPP performance showed that the polymer salt was about 115 percent of STPP.

EXAMPLE IV

The general procedure of Example II was repeated in that 8.8 grams of aldehyde ester from Example I were added to the reaction flask along with 3.7 grams of methylene chloride and 0.1 milliliter of 0.05 normal sodiodiethyl methylmalonate in tetrahydrofuran were added to initiate the polymerization. After the polymerization was finished, an additional 1 milliliter of methylene chloride was added to facilitate stirring and then 60 microliters of 25 percent triethyl aluminum in toluene (0.00013 mole) and 12 microliters of titanium tetrachloride (0.00013 mole) were added. The mixture was stirred for 15 minutes. Then, 0.96 milliliter of ethyl vinyl ether (0.01 mole) was added while maintaining the temperature at −5° C. and the solution was stirred for about 1 hour at this temperature and 2 hours at ambient temperature. The viscous polymer solution was then added dropwise to 7.2 molar sodium hydroxide with stirring at 60° C. The exothermic reaction was controlled to about 75° C. during the addition of the polymer to the sodium hydroxide. After the polymer had been added to the sodium hydroxide, the slurry was stirred for about ½ hour at 60° C., cooled to room temperature, treated with methanol to reduce product solubility, and filtered. The precipitate was dried. Analysis by Proton Nuclear Magnetic Resonance indicated the average chain length of the polymer was at least 39 units.

EXAMPLE V

The general polymerization procedure of Example III was repeated in that 3.0 grams of acetonitrile was added to 9.0 grams of aldehyde ester from Example I and polymerized at about 0° C. using 0.1 milliliter of 0.05 normal sodiodiethyl methylmalonate in tetrahydrofuran. After the polymerization was complete, 0.13 milliliter of 25 percent diethyl aluminum chloride in toluene was added and the solution was stirred for one hour at −5° C. Then, 1 milliliter of ethyl vinyl ether was added and the solution was allowed to warm to 20° C. and stirred for 3 hours. Then, 18 milliliters of 8 molar sodium hydroxide were slowly added to the solution, chilled in an ice bath to maintain the temperature below about 40° C. during the addition of the sodium hydroxide. The resulting slurry was stirred for 72 hours at ambient temperature and treated with methanol to reduce product solubility. The slurry was filtered and the precipitate was dried and analyzed. Analysis indicated a 59 percent yield based on the aldehyde ester and that the average chain length of the resulting polymer was at least 58 units.

EXAMPLE VI

The general procedure of Example V was repeated using 10.1 grams aldehyde ester and 3.4 grams acetonitrile except that 0.15 milliliter of 25 percent ethyl aluminum dichloride in toluene was used as the endcapping catalyst with 1.1 milliliters ethyl vinyl ether. Analysis revealed that the yield was 85 percent based on the aldehyde ester and the average chain length of the resulting polymer was at least 23 units.

EXAMPLE VII

The general procedure of Example V was repeated except that 0.16 milliliter of 25 percent ethyl aluminum sesquichloride $Al_2(C_2H_5)_3Cl_3$ in toluene was used as the endcapping catalyst. The product was obtained in 91 percent yield based on the aldehyde ester starting material. The average chain length was at least 30 units.

EXAMPLE VIII

The general procedure of Example V was repeated except that 0.16 milliliter of 25 percent diisobutyl aluminum hydride in toluene was added as the endcapping catalyst along with 1.1 milliliters of ethyl vinyl ether. Analysis of the product indicated a 78 percent yield based on the aldehyde ester originally added and the average chain length of the polymer was at least 57 units.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A process which comprises:
   (a) bringing together in a reaction zone under polymerization conditions an ester of glyoxylic acid and a polymerization initiator; and
   (b) adding to the resulting polymer in the presence of an organoaluminum compound an alkyl vinyl ether to stabilize the resulting polymer against rapid depolymerization in alkaline solution, the organoaluminum compound being selected from the group consisting of trialkyl aluminums, alkyl aluminum hydrides, alkyl aluminum alkoxides and alkyl aluminum halides in which the alkyl groups, alike or different, have 1 to about 10 carbon atoms each.

2. A process of claim 1 wherein the organoaluminum compound is a trialkyl aluminum compound.

3. A process of claim 1 wherein the alkyl vinyl ether contains from 3 to about 20 carbon atoms.

4. A process of claim 1 wherein the alkyl groups in the organoaluminum compound are alike or different and have 1 to about 5 carbon atoms each, and the alkyl vinyl ether contains from 3 to about 6 carbon atoms.

5. A process of claim 4 wherein the amount of organoaluminum compound is from about 0.05 mole percent to about 2 mole percent, based on the number of moles of the ester of glyoxylic acid.

6. A process of claim 5 wherein the amount of organoaluminum compound is from about 0.1 mole percent to about 0.5 mole percent, based on the number of moles of the ester of glyoxylic acid.

7. A process of claim 5 wherein the alkyl vinyl ether is added to the resulting polymer in the presence of an organoaluminum compound and a Lewis acid, the mole ratio of organoaluminum compound to Lewis acid being from about 4:1 to about 1:4.

8. A process of claim 7 wherein the Lewis acid is a halide of a metal selected from the group consisting of titanium, zirconium hafnium, boron and aluminum.

9. A process of claim 8 wherein the Lewis acid is a chloride.

10. A process of claim 9 wherein the mole ratio of organoaluminum compound to Lewis acid is from about 2:1 to about 1:1.

11. A process of claim 10 wherein the Lewis acid is a titanium chloride.

12. A process of claim 11 wherein the Lewis acid is titanium tetrachloride.

13. A process of claim 6 wherein the organoaluminum compound is selected from the group consisting of triethyl aluminum, diethyl aluminum chloride, ethyl aluminum dichloride, and diisobutyl aluminum hydride, and the alkyl vinyl ether is ethyl vinyl ether.

14. A process of claim 1 which comprises bringing together under polymerization conditions an ester of glyoxylic acid, at least one comonomer selected from the group consisting of alkylene oxides and aldehydes having from 1 to 20 carbon atoms, and a polymerization initiator.

15. A process of claim 14 wherein the organoaluminum compound is a trialkyl aluminum compound in which the alkyl groups, alike or different, have 1 to about 5 carbon atoms each, and the alkyl vinyl ether contains from 3 to about 6 carbon atoms.

16. A process of claim 13 or 15 wherein the stabilized polymer ester is saponified to the corresponding alkali metal salt.

17. A process of claim 13 or 15 wherein the stabilized polymer ester is saponified to the corresponding sodium salt.

* * * * *